United States Patent [19]

Sakamoto et al.

[11] Patent Number: 5,066,106
[45] Date of Patent: Nov. 19, 1991

[54] LIQUID CRYSTAL DISPLAY DEVICE HAVING REDUNDANT BUSES

[75] Inventors: Hirokazu Sakamoto; Makoto Ohtani; Naoki Nakagawa; Taro Maejima; Masahiro Hayama, all of Hyogo, Japan

[73] Assignee: Mitsubishi Denki Kabushiki Kaisha, Tokyo, Japan

[21] Appl. No.: 296,763

[22] Filed: Jan. 13, 1989

[30] Foreign Application Priority Data

Jan. 27, 1988 [JP] Japan ................................. 63-17808

[51] Int. Cl.$^5$ ........................ G02F 1/133; H01L 27/01
[52] U.S. Cl. ........................................ 359/59; 359/87; 357/23.7
[58] Field of Search ................... 350/332 R, 333, 334; 357/23.7; 340/784

[56] References Cited

U.S. PATENT DOCUMENTS 4,804,953  2/1989  Castleberry ........................ 340/784

FOREIGN PATENT DOCUMENTS 266252A  4/1988  France .

OTHER PUBLICATIONS

Sunata et al., "A Large-Area High-Resolution Active-Matric Color LCD", Japan Display '86, The 6th International Display Research Conference, Session P2, Oct. 1, 1986.

Primary Examiner—Stanley D. Miller
Assistant Examiner—Ron Trice
Attorney, Agent, or Firm—Leydig, Voit & Mayer

[57] ABSTRACT

A liquid crystal display device includes a transparent conductive film display electrode on a transparent insulating substrate, a plurality of lower layer source conductors disposed simultaneously with a plurality of gate electrode conductors on the substrate, the source conductors intersecting the gate electrode conductors, a gate insulation film on the gate electrode conductors, the lower layer source conductors, and the display electrode, a semiconductor film disposed on the gate insulation film at a position overlying the gate electrode conductors, a drain electrode connected to the display electrode and disposed on the semiconductor film and the gate insulation film, and an upper layer source electrode conductor connected to the lower layer source conductors, the upper layer source electrode conductor disposed on the gate insulation film and the semiconductor film and forming a double-layer structure with the lower layer source conductors.

5 Claims, 2 Drawing Sheets

LIQUID CRYSTAL DISPLAY DEVICE HAVING REDUNDANT BUSES

BACKGROUND OF THE INVENTION

1. Field of the Invention

This invention relates to a matrix type display device employing a TFT (Thin Film Transistor) array substrate, and more particularly to a liquid crystal display device which is improved by a reduced possibility of wiring breakage defects and a higher yield in manufacturing the device with a larger area and a higher resolution.

2. Description of the Prior Art

FIGS. 1 and 2 each illustrate a TFT array substrate constituting a conventional liquid crystal display device of the above-mentioned type. FIG. 1 is a partial plan view of the TFT array substrate produced by a conventional manufacturing method, while FIG. 2 is a enlarged partial sectional view taken along line II—II of FIG. 1.

In the figures, numeral 1 denotes a transparent insulating substrate, 2 gate electrode wiring, 3 a gate insulation film, 4 a semiconductor film, 5 a source electrode wiring, 6 a drain electrode, and 7 denotes a display electrode.

The method of manufacturing the TFT array substrate according to the prior art will now be explained below while referring to FIGS. 1 and 2. First, a transparent conductive film of indium tin oxide (hereinafter abbreviated to "ITO") or the like is deposited on a polished and cleaned surface of a transparent insulating substrate 1 of glass or the like by a sputtering process, an EB (Electron Beam) vapor deposition process or the like, followed by a photo-etching process or the like to form the pattern of display electrodes 7 desired.

Next, a film of a metal such as Cr, Ta, Al, etc. or an alloy thereof is deposited by a sputtering process, an EB vapor deposition process or the like, followed by a photo-etching process to form the pattern of gate electrode wiring 2 desired.

Then, a film of dielectric such as SiN and $SiO_2$ as a gate insulation film 3 and a film of amorphous silicon (hereinafter abbreviated to "a-Si") or polysilicon (hereinafter abbreviated to "P-Si") as a semiconductor film 4 are consecutively deposited by a plasma CVD process or the like. The upper semiconductor film 4 is patterned by a photo-etching process or the like, and the lower gate insulation film 3 is patterned by a similar process.

Finally, a film of a metal such as Al or an alloy thereof is deposited by a sputtering process, an EB vapor deposition process or the like, followed by a photo-etching process or the like to form source electrode wiring 5 and drain electrodes 6. Thus, the TFT array substrate is completed.

The method of producing the TFT array substrate constituting the liquid crystal display device according to the prior art employs the above-mentioned steps. There is the problem that during the repeated film-forming and patterning steps before the completion of the source electrode wiring 5, foreign matter such as dust may be deposited on the substrate, or defects may be present in a resist used for the photo-etching step for forming the source electrode wiring 5, resulting in breakage of the source electrode wiring.

Particularly when the substrate becomes larger, with an attendant increase in the number of the conductors, or density is increased with an attendant reduction in the width of the wiring, the possibility of the breakage of source electrode wirings is increased sharply.

Accordingly, the TFT array substrate and the liquid crystal display device as the matrix type display device produced by the above-mentioned method have the problems of poor performance and an extremely low yield of the product.

SUMMARY OF THE INVENTION

This invention has been made in order to solve the above-mentioned problems involved in the prior art, and it is an object of the invention to provide a liquid crystal display device having a construction that reduces source wiring breakage defects and enhances performance and yield of the product.

The liquid crystal display device according to this invention comprises, newly added thereto, a lower layer source wiring formed simultaneously with a gate electrode wiring on a transparent insulating substrate, and an upper layer source electrode wiring which is connected to the lower layer source wiring through a contact hole and is disposed on a gate insulation film and a semiconductor film on the gate electrode wiring.

In the invention, therefore, the lower layer source wiring deposited simultaneously with the gate electrode wiring forms a double-layer structure with the upper layer source electrode wiring provided on the gate insulation film and the semiconductor film. As a result, breakage of the source wiring will not occur even in the case of deposition of foreign matter after formation of the gate electrode wiring, and there is little possibility of simultaneous generation of pattern defects in the portions constituting the double-layer structure.

DETAILED DESCRIPTION OF THE PREFERRED EMBODIMENTS

Figure 1:
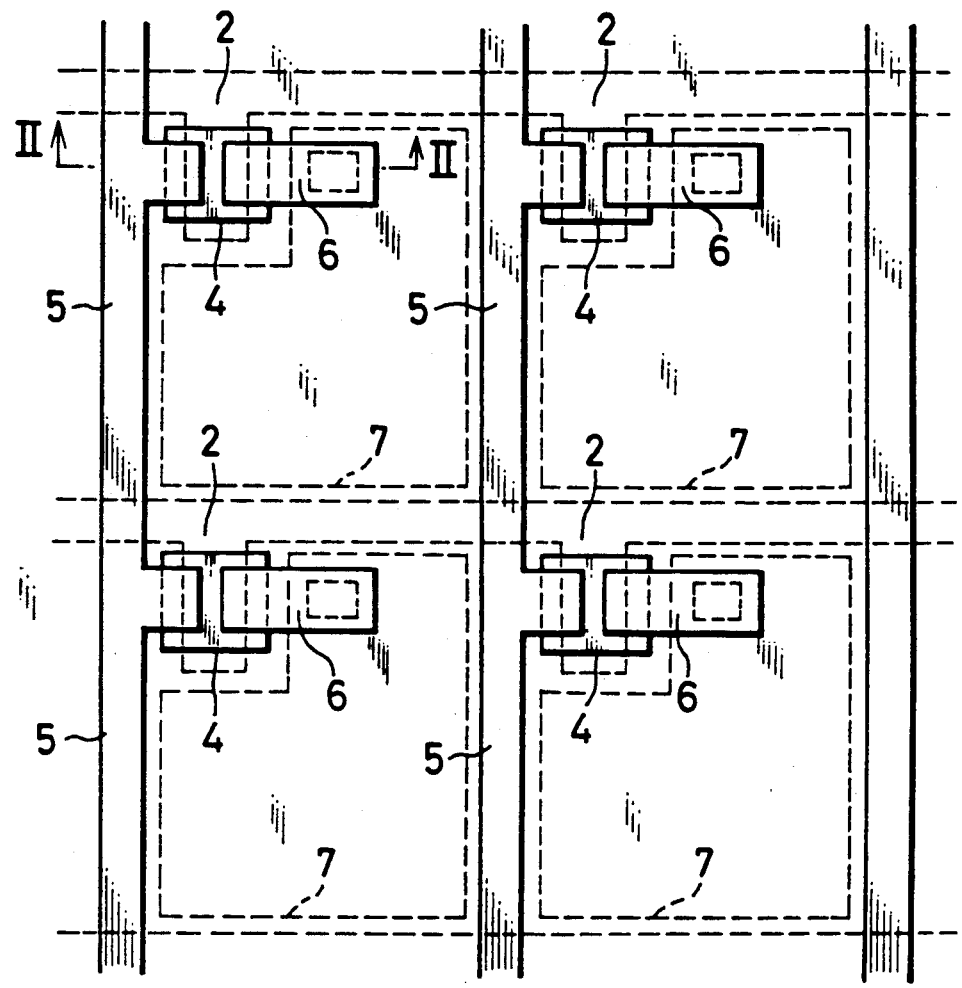
FIG. 1 is a partial plan view of a liquid crystal display device according to the prior art.

One embodiment of the liquid crystal display device of this invention will now be explained below while referring to the drawings. FIG. 3 is a partial plan view of a TFT array substrate constituting a liquid crystal display device produced according to the invention. FIG. 4 is a sectional view taken along line IV—IV of FIG. 3. In FIGS. 3 and 4, the same components as those in FIGS. 1 and 2 are assigned the same reference number as those in FIGS. 1 and 2.

Figure 2:
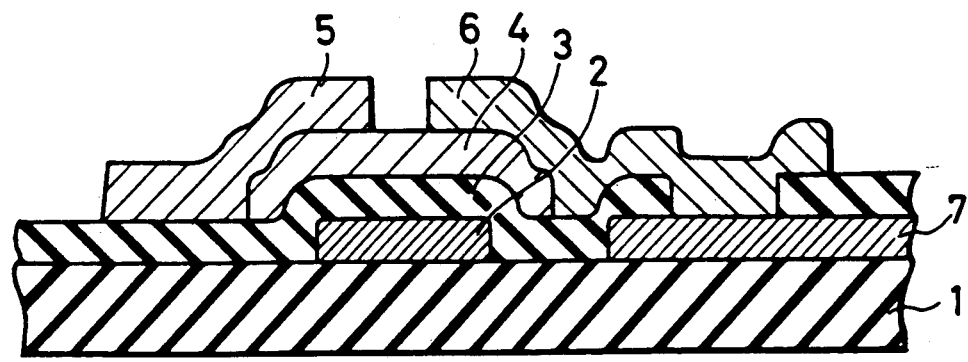
FIG. 2 is a sectional view taken along line II—II of FIG. 1.
Figure 3:
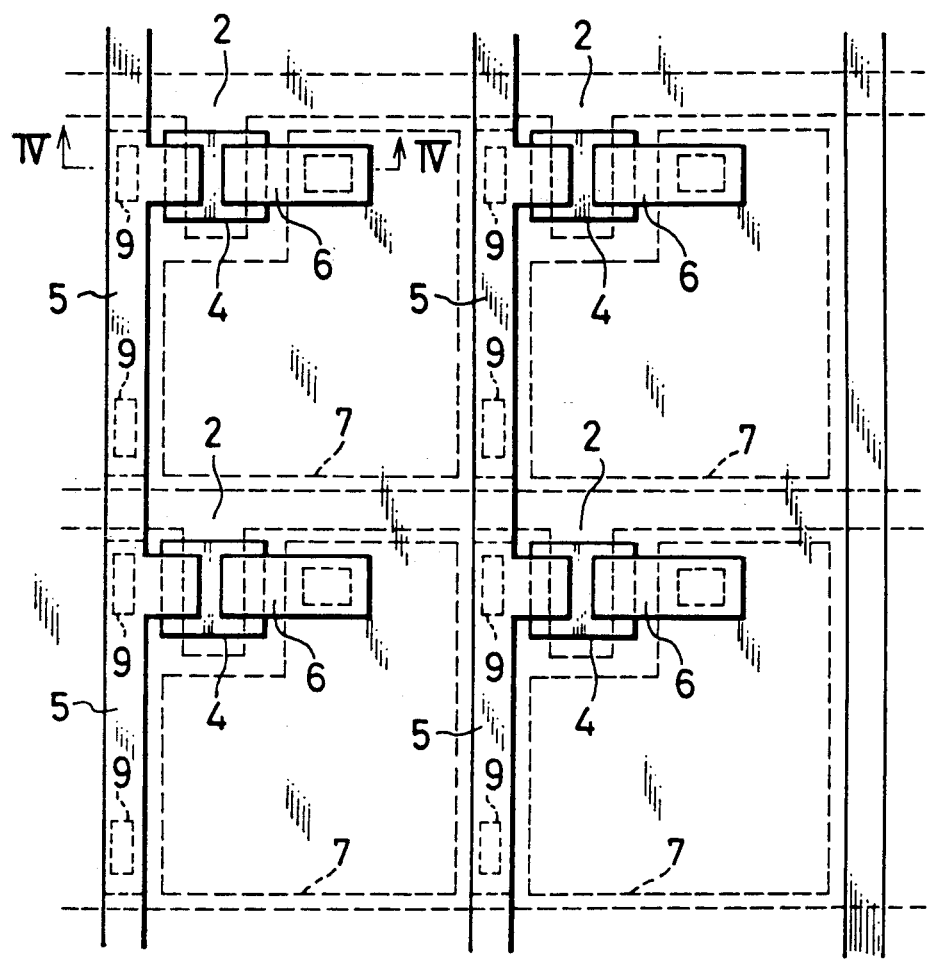
FIG. 3 is a partial plan view of a liquid crystal display device according to one embodiment of this invention.
Figure 4:
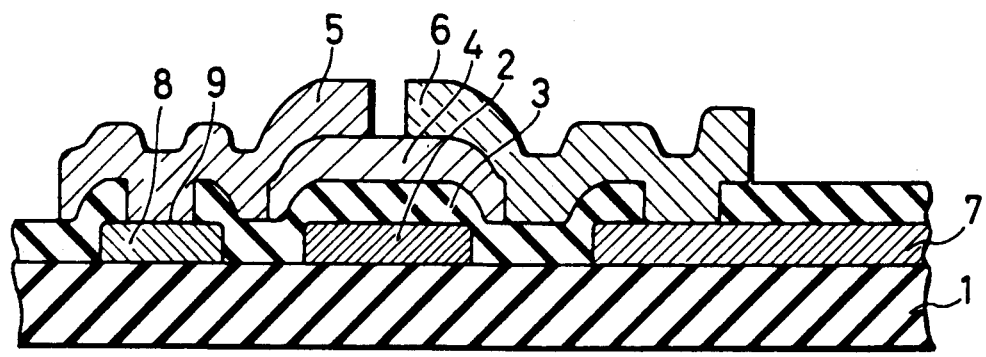
FIG. 4 is a sectional view taken along line IV—IV of FIG. 3.

In FIGS. 3 and 4, numerals 1 to 7 denote the same components as those in FIGS. 1 and 2, and numerals 8 and 9 denote the components newly added. Numeral 8 denotes a plurality of lower layer source wiring formed simultaneously with a plurality of gate electrode wiring 2. Numeral 9 denotes contact holes, through which the lower layer source wiring 8 is connected to the upper source electrode wiring 5.

Now, the steps for producing the liquid crystal display device according to the invention will be described. First, a transparent conductive film of ITO or the like is deposited on a polished and cleaned surface of a transparent insulating substrate 1 of glass or the like by a sputtering process, and EB vapor deposition process or the like, followed by a photo-etching process or the like to form the pattern of display electrodes 7 desired.

Next, a film of a metal such as Cr, Ta, Al, etc. or an alloy thereof is deposited by a sputtering process, an EB vapor deposition process or the like, followed by a photo-etching process or the like to form a pattern, by which means the gate electrode wiring 2 and part of the source wirings 8 are simultaneously formed.

Subsequently, a film of a dielectric such as SiN and SiO$_2$ as the gate insulation film 3 and a film of a-Si or P-Si as a semiconductor film are consecutively deposited by a plasma CVD process or the like. The upper layer semiconductor film 4 is subjected to a photo-etching process or the like to form a desired pattern, and the lower layer gate insulation film 3 is also patterned by a similar process. In this case, the contact holes 9 are disposed overlying part of the lower layer source wiring 8 previously provided, in order that the subsequently deposited upper layer source electrode wiring 5 are connected to the lower layer source wiring 8.

Finally, a film of a metal such as Al or an alloy thereof is deposited by a sputtering process, an EB vapor deposition process or the like, followed by a photo-etching process or the like to form the upper layer source electrode wiring 5 and the drain electrodes 6. Thus, the TFT array substrate constituting the liquid crystal display device of the invention is completed.

In the TFT array substrate of the construction mentioned above, part of the lower layer source wiring 8 is formed simultaneously with the gate electrode wiring 2. The double-layer source wiring construction comprises of the lower layer source wiring 8 and the upper layer electrode wiring 5. Accordingly, a source wiring breakage defect is not produced even when foreign matter is deposited after the formation of the gate electrode wiring 2.

Besides, there is an extremely low possibility of simultaneous generation of pattern defects or the like in the lower layer source wiring 8, formed simultaneously with the gate electrode wiring 2, and in the source electrode wiring 5 at wiring 8. Accordingly, breakage of wiring rarely arises from such a cause.

For instance, where the interval of the gate electrode wiring 2 in FIG. 3 is 300 $\mu$m, the width of the gate electrode wiring is 20 $\mu$m and the interval between the gate electrode wiring 2 and the lower layer source wiring 8 formed simultaneously with the gate electrode wiring 2 is 20 $\mu$m. Breakage of the source wiring due to the presence of foreign matter occurs only when the foreign matter is present over at least a 60 $\mu$m portion at which the double-layer construction is not provided. Thus, the possibility of breakage of the source wiring due to the presence of foreign matter is reduced to 60/300 = 1/5, as compared with that in the prior art where the double-layer construction is not provided at all.

As has been described above, according to this invention, the lower layer source wiring is formed simultaneously with the gate electrode wiring on the transparent insulating substrate, while the lower layer source wiring is connected to the source electrode wiring provided at an upper layer portion overlying the gate electrode wiring, and part of the source wiring is provided with a double-layer source wiring structure. Therefore, there is an extremely low possibility of breakage of the source wiring, resulting in enhanced performance of the TFT array substrate, and yield. Besides, the number of steps for producing the liquid crystal display device of this invention is the same as that in the prior art, and, therefore, it is possible to obviate a rise in cost.

What is claimed is:

1. A liquid crystal display device comprising a transparent insulating substrate, a display electrode including a transparent conductive film disposed on said substrate, a plurality of simultaneously formed lower layer source and gate electrode conductors disposed on said substrate, said lower layer source conductors crossing and electrically insulated from said gate electrode conductors, a gate insulation film disposed on said gate electrode conductors, said lower layer source conductors, and said display electrode, a semiconductor film disposed on said gate insulation film at a position overlying said gate electrode conductors, a drain electrode connected to said display electrode and disposed on said semiconductor film and said gate insulation film, and an upper layer source electrode conductor connected to the lower layer source conductors, said upper layer source electrode conductor being disposed on said gate insulation film, said semiconductor film, and said lower layer source conductor and forming a double-layer structure with said lower layer source conductor wherein said upper layer source electrode conductor contacts said lower layer source conductors through a contact hole in said gate insulation film.

2. A liquid crystal display device comprising:
a transparent insulating substrate;
a transparent conductive film disposed on said substrate;
a display electrode disposed on said transparent conductive film;
a plurality of spaced apart gate electrode conductors disposed on said substrate;
a gate electrode extending from one of said gate electrode conductors and disposed on said substrate;
a gate insulation film disposed on said gate electrode, said gate electrode conductors, and said display electrode;
a semiconductor film disposed on said gate insulation film overlying said gate electrode;
a plurality of spaced apart source conductors disposed on said gate insulation film, crossing and insulated from the gate electrode conductors by said gate insulation film;
a drain electrode electrically connected to and disposed on part of said display electrode and said semiconductor film and disposed on part of said gate insulation film;
a plurality of lower layer source conductors formed simultaneously with said gate electrode conductors and disposed on said substrate; and
a source electrode electrically connected to one of said source conductors, electrically connected to and disposed on said semiconductor film, and disposed on part of said gate insulation film wherein said gate insulation film includes a plurality of openings, each opening being disposed beneath one of said source conductors, extending to a respective lower layer source conductor, spaced from and adjacent to a gate conductor where said gate conductor crosses the respective source conductor, a portion of the respective source conductor filling each of the respective openings in electrical contact with said respective lower layer source conductor.

3. The device as set forth in claim 2 wherein said gate insulation film is a dielectric selected from the group consisting of SiN and SiO$_2$.

4. The device as set forth in claim 2 wherein said gate semiconductor film is selected from the group consisting of amorphous silicon and polycrystalline silicon.

5. The device as set forth in claim 2 wherein one of the openings in the gate insulation film filled by a portion of the respective source conductor is disposed adjacent to each side of at least one of said gate conductors where the respective source conductor crosses said at least one gate conductor.

* * * * *